US009604681B2

(12) United States Patent
Diekevers et al.

(10) Patent No.: US 9,604,681 B2
(45) Date of Patent: Mar. 28, 2017

(54) TRACK JOINT ASSEMBLIES

(71) Applicant: Caterpillar Inc., Peoria, IL (US)

(72) Inventors: Mark Steven Diekevers, Germantown Hills, IL (US); Caroline Marie Brewer, Peoria, IL (US); Gregory Jerome Kaufmann, Metamora, IL (US); Timothy Arthur Thorson, Morton, IL (US); Kevin Lee Steiner, Tremont, IL (US); Temitope Olayemi Akinlua, Peoria, IL (US); Robert Lee Meyer, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 71 days.

(21) Appl. No.: 14/461,249

(22) Filed: Aug. 15, 2014

(65) Prior Publication Data

US 2015/0061374 A1 Mar. 5, 2015

Related U.S. Application Data

(60) Provisional application No. 61/871,608, filed on Aug. 29, 2013.

(51) Int. Cl.
*B62D 55/088* (2006.01)
*B62D 55/21* (2006.01)

(52) U.S. Cl.
CPC ......... *B62D 55/0887* (2013.01); *B62D 55/21* (2013.01)

(58) Field of Classification Search
CPC ... B62D 55/088; B62D 55/0887; B62D 55/21
(Continued)

(56) References Cited

U.S. PATENT DOCUMENTS 2,905,511 A 9/1959 Cerness
3,622,165 A 11/1971 Hatch
(Continued)

FOREIGN PATENT DOCUMENTS

DE 3823571 A1 1/1990
EP 0101415 2/1984
(Continued)

OTHER PUBLICATIONS

U.S. Appl. No. 14/461,328 of Steiner et al., titled "Joint Bushings for Track Joint Assemblies," filed Aug. 15, 2014.
(Continued)

*Primary Examiner* — S. Joseph Morano
*Assistant Examiner* — Jean Charleston
(74) *Attorney, Agent, or Firm* — Finnegan, Henderson, Farabow, Garrett & Dunner, LLP

(57) ABSTRACT

Disclosed are various exemplary embodiments of a track joint assembly. In one exemplary embodiment, the track joint assembly may include a first link having a first bore. The track joint assembly may also include a second link having a second bore. In addition, the track joint assembly may include a solid pin positioned at least partially within the first bore. The track joint assembly may also include a bushing positioned coaxially around the pin. The bushing may include an axial end portion disposed in the second bore. The second link may include a sealing portion surrounding an axial end of the axial end portion. The sealing portion may include material having a different wear resistance than material of another portion of the second link.

20 Claims, 11 Drawing Sheets

(58) Field of Classification Search
USPC ....... 305/100, 102, 103, 104, 105, 106, 185, 305/202, 203, 204
See application file for complete search history.

(56) References Cited

U.S. PATENT DOCUMENTS

| | | | |
|---|---|---|---|
| 3,851,932 | A | 12/1974 | Story et al. |
| 3,909,076 | A | 9/1975 | Kato |
| 4,067,414 | A | 1/1978 | Funke |
| 4,150,856 | A | 4/1979 | Hakkenberg et al. |
| 4,204,716 | A | 5/1980 | Baylor |
| 4,274,682 | A | 6/1981 | Livesay |
| 4,324,437 | A | 4/1982 | Narang |
| 4,331,339 | A | 5/1982 | Reinsma |
| 4,618,190 | A | 10/1986 | Garman et al. |
| 4,693,617 | A | 9/1987 | Roemer et al. |
| 5,069,509 | A | 12/1991 | Johnson et al. |
| 5,145,266 | A | 9/1992 | Saneshige et al. |
| 5,175,999 | A | 1/1993 | Hara et al. |
| 5,183,318 | A | 2/1993 | Taft et al. |
| 5,257,858 | A | 11/1993 | Taft |
| 5,390,997 | A | 2/1995 | Nakaishi et al. |
| 5,511,869 | A | 4/1996 | Edwards et al. |
| 5,836,699 | A | 11/1998 | Back et al. |
| 5,853,233 | A | 12/1998 | Turner |
| 5,938,345 | A | 8/1999 | Wu |
| 5,994,664 | A | 11/1999 | Anderton et al. |
| 6,024,495 | A | 2/2000 | Loos et al. |
| 6,045,200 | A | 4/2000 | Anderton et al. |
| 6,142,588 | A | 11/2000 | Ketting et al. |
| 6,206,491 | B1 | 3/2001 | Hisamatsu |
| 6,371,577 | B1 | 4/2002 | Hasselbusch et al. |
| 6,382,742 | B1 | 5/2002 | Hasselbusch et al. |
| 6,565,161 | B2 | 5/2003 | Anderton |
| 6,644,430 | B2 | 11/2003 | Harer et al. |
| 6,739,680 | B2 | 5/2004 | Hasselbusch et al. |
| 6,883,876 | B2 | 4/2005 | Yamamoto et al. |
| 6,886,323 | B2 | 5/2005 | Yamamoto |
| 6,938,732 | B2 | 9/2005 | Garbagnati |
| 7,240,973 | B2 | 7/2007 | Takayama |
| 7,347,513 | B2 | 3/2008 | Johannsen et al. |
| 7,597,410 | B2 | 10/2009 | Mulligan et al. |
| 7,850,256 | B2 | 12/2010 | Mulligan |
| 7,887,240 | B2 | 2/2011 | Marathe et al. |
| 7,959,239 | B2 | 6/2011 | Diekevers et al. |
| 8,025,346 | B2 | 9/2011 | Livesay |
| 8,070,241 | B2 | 12/2011 | Mulligan |
| 8,075,192 | B2 | 12/2011 | Yamamoto et al. |
| 8,336,970 | B2 | 12/2012 | Johannsen et al. |
| 8,657,498 | B2 | 2/2014 | Cooley et al. |
| 8,905,640 | B2 | 12/2014 | Snyder et al. |
| 9,045,179 | B2 | 6/2015 | Giusti |
| 9,045,180 | B2 | 6/2015 | Brewer et al. |
| 9,061,720 | B2 | 6/2015 | Giusti |
| 9,126,645 | B2 * | 9/2015 | Hasselbusch ...... B62D 55/0887 |
| 2002/0145336 | A1 | 10/2002 | Bottom et al. |
| 2003/0000747 | A1 | 1/2003 | Sugiyama et al. |
| 2004/0126040 | A1 | 7/2004 | Shih et al. |
| 2005/0069235 | A1 | 3/2005 | Shih et al. |
| 2006/0181151 | A1 * | 8/2006 | Wodrich ............... B62D 55/15 305/201 |
| 2009/0108541 | A1 | 4/2009 | Beardsley et al. |
| 2009/0142011 | A1 | 6/2009 | Yamamoto et al. |
| 2010/0007206 | A1 * | 1/2010 | Wodrich ............... B22D 19/08 305/198 |
| 2010/0102624 | A1 | 4/2010 | Mulligan |
| 2010/0270856 | A1 | 10/2010 | Maeda et al. |
| 2011/0049975 | A1 * | 3/2011 | Mulligan ............ B62D 55/092 305/196 |
| 2011/0079451 | A1 | 4/2011 | Clarke et al. |
| 2011/0309672 | A1 * | 12/2011 | Thorson ............... B62D 55/092 305/138 |
| 2012/0002910 | A1 | 1/2012 | Snyder et al. |
| 2012/0019055 | A1 | 1/2012 | Giusti |
| 2012/0267859 | A1 | 10/2012 | Liang et al. |
| 2012/0267947 | A1 | 10/2012 | Johannsen et al. |
| 2013/0002010 | A1 | 1/2013 | Hasselbusch et al. |

FOREIGN PATENT DOCUMENTS

| | | |
|---|---|---|
| EP | 1 065 138 A2 | 1/2001 |
| EP | 1 069 032 A2 | 1/2001 |
| EP | 1 591 350 A2 | 11/2005 |
| EP | 1775204 | 4/2007 |
| EP | 2 269 898 A2 | 1/2011 |
| EP | 2514657 | 10/2012 |
| JP | 58-093678 A | 6/1983 |
| JP | 59-114169 | 7/1984 |
| JP | 61-046772 A | 3/1986 |
| JP | 11-348844 A | 12/1999 |
| JP | 2003-127919 A | 5/2003 |
| JP | 2009216174 | 9/2009 |
| JP | 2010133230 | 6/2010 |
| JP | 5480591 B2 | 4/2014 |
| KR | 1020050026223 | 3/2005 |
| WO | 9119634 | 12/1991 |
| WO | WO 93/11020 | 6/1993 |
| WO | WO 00/29275 | 5/2000 |
| WO | WO 02/16060 | 2/2002 |
| WO | WO 2009/120593 | 10/2009 |

OTHER PUBLICATIONS

U.S. Appl. No. 14/461,269 of Thorson et al., titled "Track Joint Assemblies and Thrust Rings for Same," filed Aug. 15, 2014.
U.S. Appl. No. 14/461,321 of Kaufman et al., titled "Track Joint Assemblies," filed Aug. 15, 2014.
U.S. Appl. No. 14/461,304 of Brewer et al., filed Aug. 15, 2014, titled "Track Joint Assemblies,".
U.S. Appl. No. 14/461,289 of Akinlua et al., filed Aug. 15, 2014, titled "Track Joint Assemblies,".
International Search Report and Written Opinion mailed Dec. 30, 2014, in PCT/US2014/052519 filed Aug. 25, 2014 (14 pages).
International Search Report and Written Opinion mailed Dec. 26, 2014, in PCT/US2014/052526 filed Aug. 25, 2014 (10 pages).
International Search Report and Written Opinion mailed Dec. 23, 2014, in PCT/US2014/052536 filed Aug. 25, 2014 (14 pages).
International Search Report and Written Opinion mailed Dec. 23, 2014, in PCT/US2014/052539, filed Aug. 25, 2014 (10 pages).

* cited by examiner

TRACK JOINT ASSEMBLIES

CROSS-REFERENCE TO RELATED APPLICATION

This application claims the benefit of U.S. Provisional Patent Application No. 61/871,608, filed Aug. 29, 2013, which is hereby incorporated by reference in its entirety.

TECHNICAL FIELD

The present disclosure relates generally to track assemblies and, more particularly, to track joint assemblies for joining links of the track assemblies.

BACKGROUND

Many earth-working machines, such as, for example, loaders, tractors, and excavators, include tracked undercarriages to facilitate movement of the machines over ground surfaces. Such undercarriages include drive sprockets that rotate track assemblies about one or more idlers or other guiding components to propel the machines over the ground surfaces. Each track assembly includes a pair of parallel chains, each made up of a series of links, joined to each other by pins and/or bushings (the combination of which is sometimes referred to as a cartridge assembly). Due to extreme wear from abrasion and impacts experienced during use, undercarriage maintenance costs often constitute more than one quarter of the total costs associated with operating the earth-working machines.

FIG. 1 provides an example of a prior art cartridge assembly 10 for coupling links, which is disclosed by U.S. Patent Application Publication No. 2012/0267947 by Johannsen et al. As shown, cartridge assembly 10 includes a pin 12 accommodated within an inner bushing 14, which is, in turn, accommodated within an outer bushing 16. End portions 17a, 17b of inner bushing 14 are surrounded by inserts 19a, 19b, and end portions 21a, 21b of pin 12 are surrounded by collars 23a, 23b. Pin 12 has a lubricant channel 25, which serves as a reservoir for lubricant and delivers lubricant to a gap between pin 12 and inner bushing 14, and to a gap between inner bushing 14 and outer bushing 16. The lubricant is retained by seals 27a, 27b positioned between outer bushing 16 and inserts 19a, 19b, and by seals 29a, 29b positioned between inserts 19a, 19b and collars 23a, 23b.

Cartridge assembly 10 may provide certain benefits that are particularly important for some applications. However, it may have certain drawbacks. For example, manufacturing pin 12 to include channel 25 may be complicated and costly. As another example, manufacturing links large enough to accommodate inserts 19a, 19b and collars 23a, 23b (as opposed to just pin 12 and inner bushing 14) may require an excessive amount of material. The disclosed embodiments may help solve these problems.

SUMMARY

One disclosed embodiment relates to a track joint assembly. The track joint assembly may include a first link having a first bore. The track joint assembly may also include a second link having a second bore. In addition, the track joint assembly may include a solid pin positioned at least partially within the first bore. The track joint assembly may also include a bushing positioned coaxially around the pin. The bushing may include an axial end portion disposed in the second bore. The second link may include a sealing portion surrounding an axial end of the axial end portion. The sealing portion may include material having a different wear resistance than material of another portion of the second link.

Another disclosed embodiment relates to a track joint assembly. The track joint assembly may include a first link having a first bore. The track joint assembly may also include a second link having a second bore. In addition, the track joint assembly may include a bushing. The bushing may include a first axial end portion disposed in the first bore. The bushing may also include a second axial end portion disposed in the second bore. The first link may include a sealing portion surrounding an axial end of the first axial end portion. The sealing portion may include material having a different wear resistance than material of another portion of the first link.

A further disclosed embodiment relates to a track joint assembly. The track joint assembly may include a first link having a first bore. The track joint assembly may also include a second link having a second bore. Additionally, the track joint assembly may include a solid pin positioned at least partially within the first bore. The track joint assembly may also include a bushing positioned coaxially around the pin, and at least partially within the second bore. In addition, the track joint assembly may include a seal assembly positioned between the first link and the second link, and contacting the second link.

DETAILED DESCRIPTION

Figure 1:
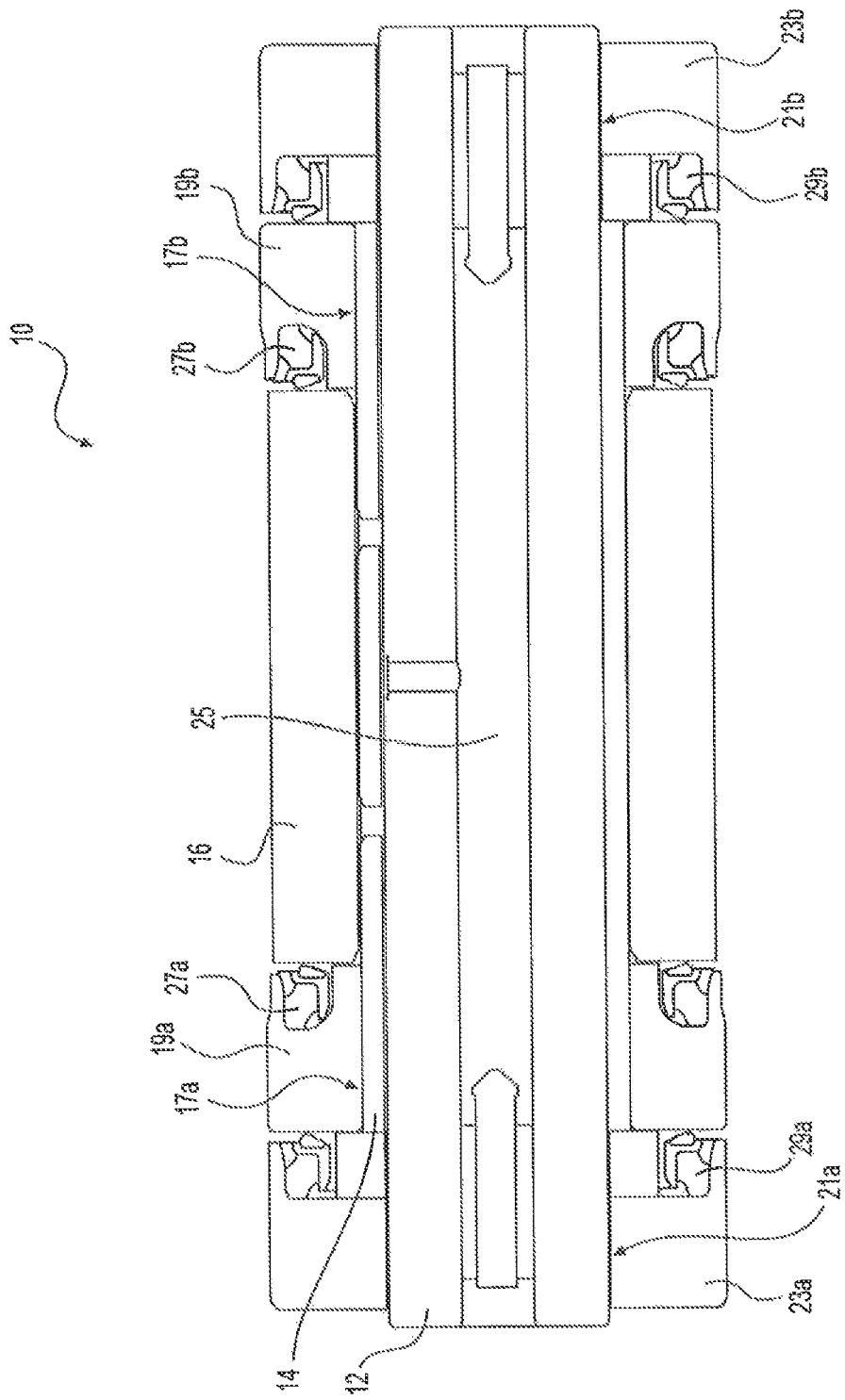
FIG. 1 is a view of a prior art cartridge assembly.
Figure 2:
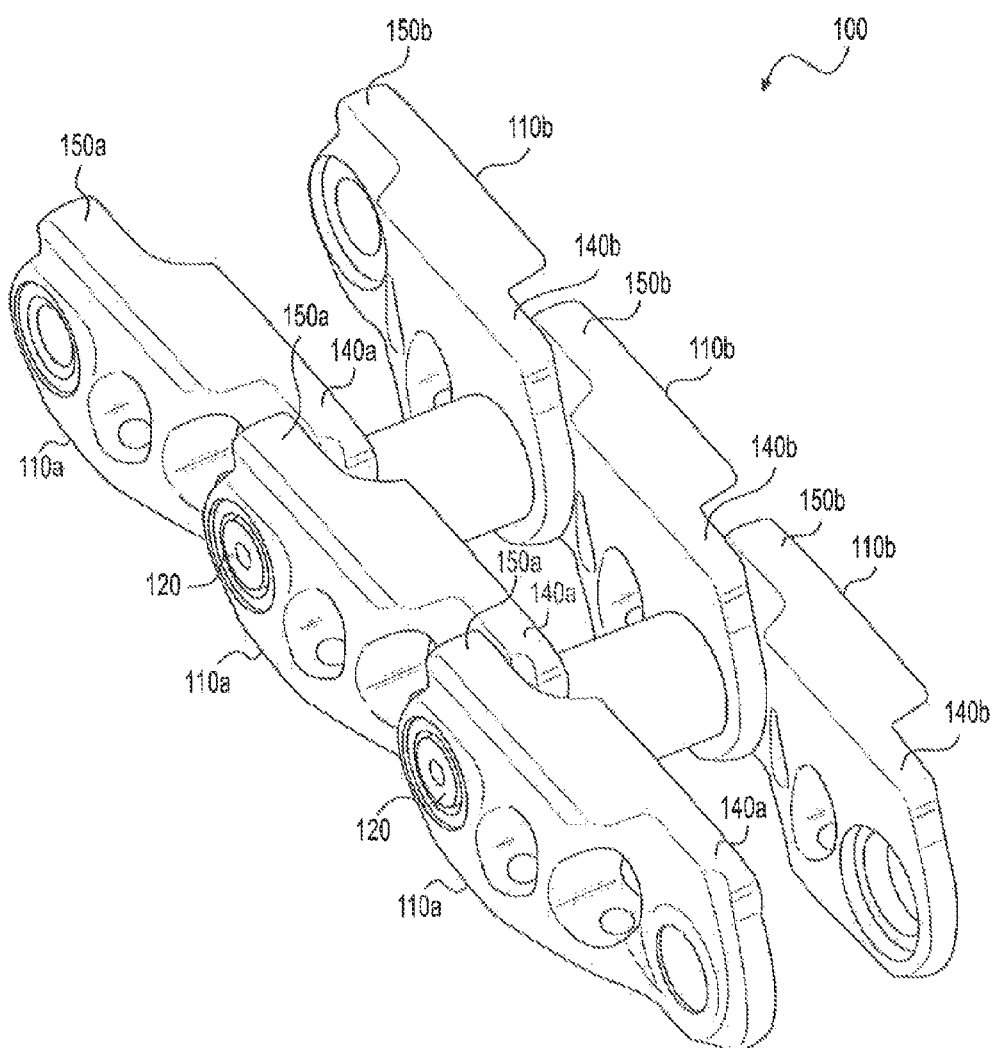
FIG. 2 is a perspective view of a track assembly according to the present disclosure.

FIG. 2 illustrates an exemplary track assembly 100 for a track-type machine. For example, the track-type machine may be a loader, a tractor, an excavator, a tank, or another mobile machine having track-type traction devices. When operated, a drive sprocket of the track-type machine (not shown) may rotate track assembly 100 about one or more idlers or other guiding components (not shown) to facilitate movement of the track-type machine.

Track assembly 100 may include a series of links 110a joined to each other and to a series of links 110b by laterally disposed pins 120. As shown, links 110a and 110b may be offset links. That is, they may have inwardly offset ends 140a, 140b and outwardly offset ends 150a, 150b. An inwardly offset end 140a, 140b of each link 110a, 110b may be joined to an outwardly offset end 150a, 150b of each adjacent link 110a, 110b. In addition, an inwardly offset end 140*a* of each link 110*a* may be joined to an inwardly offset end 140*b* of an opposing link 110*b*, and an outwardly offset end 150*a* of each link 110*a* may be joined to an outwardly offset end 150*b* of an opposing link 110*b*. It should be understood, however, that links 110*a* and 110*b* need not be offset links. Rather, in some embodiments, links 110*a* and 110*b* may be inner links and outer links. In such embodiments, both ends of each opposing pair of inner links would be sandwiched between ends of opposing outer links, as is known in the art.

Figure 3:
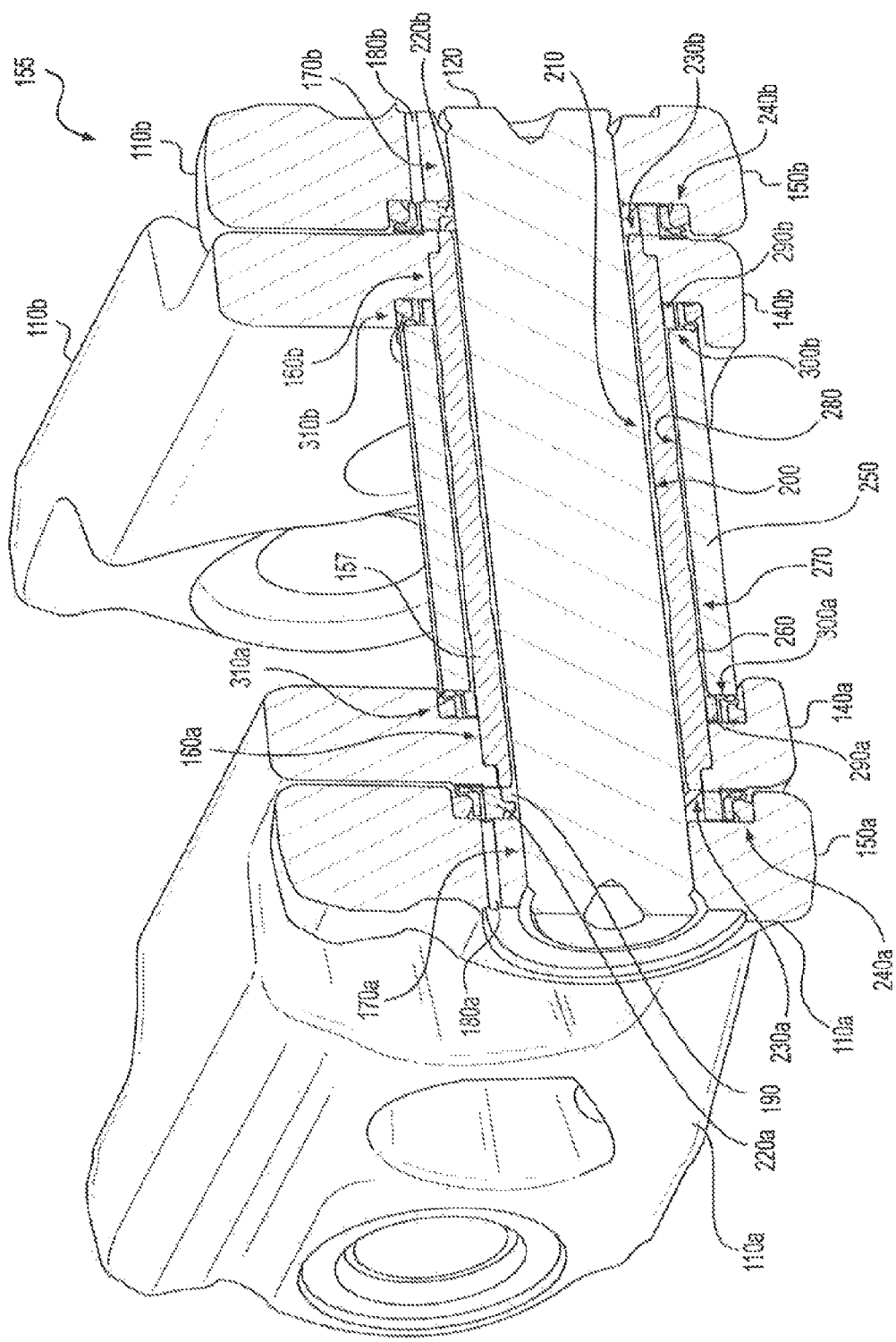
FIG. 3 is a cutaway view of a track joint assembly of the track assembly of FIG. 2.
Figure 4:
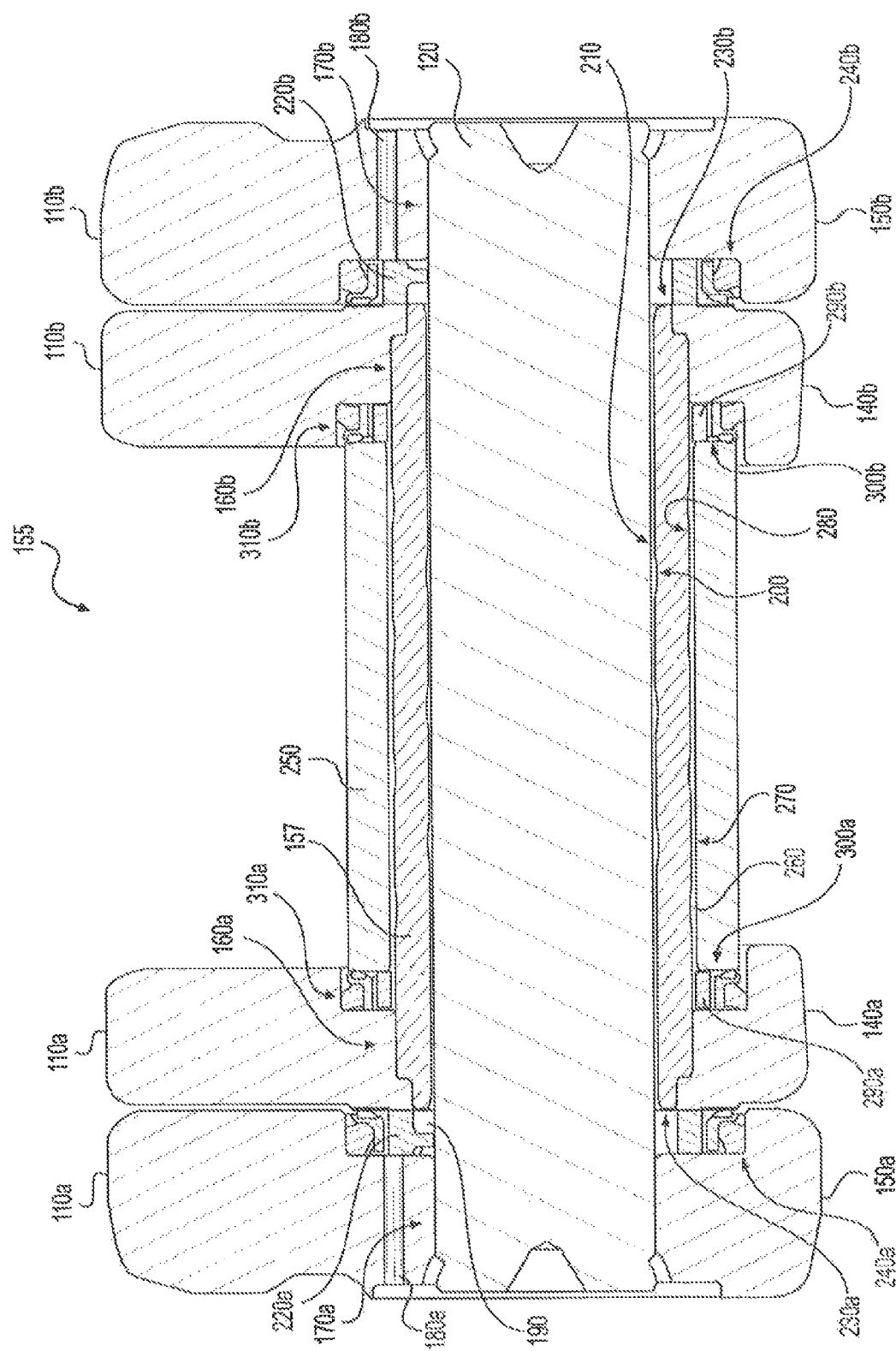
FIG. 4 is a cross-section of the track joint assembly of FIG. 3.

Referring to FIGS. 3 and 4, an individual track joint assembly 155 of track assembly 100 may include two links 110*a* joined to two links 110*b*. As shown, inwardly offset ends 140*a*, 140*b* of links 110*a*, 110*b* may be secured to a joint bushing 157, which may be at least partially positioned within bushing bores 160*a*, 160*b* of offset ends 140*a*, 140*b*. Similarly, outwardly offset ends 150*a*, 150*b* of links 110*a*, 110*b* may be secured to as pin 120, which may be at least partially positioned within pin bores 170*a*, 170*b* of offset ends 150*a*, 150*b*. For example, the securing may be by way of press-fits. Specifically, bushing 157 may be press-fit into bushing bores 160*a*, 160*b*, and pin 120 may be press-fit into pin bores 170*a*, 170*b*. Alternatively, the securing may be by way of welds, snap rings, or other mechanisms known in the art.

As shown, bushing 157 may be positioned coaxially around pin 120, and may rotate relative to pin 120, allowing inwardly offset ends 140*a*, 140*b* to pivot relative to outwardly offset ends 150*a*, 150*b* as track assembly 100 rotates. In order to facilitate such rotation, one or both of bushing 157 and pin 120 may be coated with diamond like carbon or electroless nickel, or may be carburized, nitrified, or polished to reduce friction between bushing 157 and pin 120. Alternatively or additionally, a lubricating fluid may be situated between bushing 157 and pin 120.

The lubricating fluid may be added through openings 180*a*, 180*b* in links 110*a*, 110*b*, and may be contained in a lubricating fluid cavity 190 at least partially defined by a generally cylindrical inner surface 200 of inner bushing 157 and a generally cylindrical outer surface 210 of pin 120 facing surface 200. Unlike the prior art cartridge assembly discussed above, lubricating fluid cavity 190 may not extend into an interior cavity of pin 120, as pin 120 may be solid. Since pin 120 may not contain lubricating fluid, lubricating fluid cavity 190 may extend into and be at least partially defined by one or more recesses in surface 200 or surface 210. Alternatively or additionally, lubricating fluid cavity 190 may extend into and be at least partially defined by thrust rings 220*a*, 220*b* positioned at axial ends 230*a*, 230*b* of bushing 157. Thrust rings 220*a*, 220*b* may transmit axial load between adjacent links 110*a*, 110*b*, and may limit axial load on seal assemblies 240*a*, 240*b*, which may be positioned radially outward of thrust rings 220*a*, 220*b* and form hermetic seals between adjacent links 110*a*, 110*b* to retain the lubricating fluid in lubricating fluid cavity 190.

Still referring to FIGS. 3 and 4, in some embodiments, track joint assembly 155 may also include an outer bushing 250, which may be positioned coaxially around bushing 157 (making bushing 157 an inner bushing) to engage a drive sprocket (not shown) that rotates track assembly 100. Outer bushing 250 may rotate relative to inner bushing 157 when it engages the drive sprocket, reducing wear on outer bushing 250 caused by sliding motion between outer bushing 250 and the drive sprocket. Such rotation may be facilitated by coating one or both of outer bushing 250 and inner bushing 157 with diamond like carbon or electroless nickel, or by carburizing, nitriding, or polishing one or both of outer bushing 250 and inner bushing 157 to reduce friction between outer bushing 250 and inner bushing 157. Alternatively or additionally, lubricating fluid may be situated between outer bushing 250 and inner bushing 157. This lubricating fluid may be the same as or different from the lubricating fluid situated between inner bushing 157 and pin 120.

The lubricating fluid may be added during assembly of track joint assembly 155, and may be contained in a lubricating fluid cavity 260 at least partially defined by a generally cylindrical inner surface 270 of outer bushing 250 and a generally cylindrical outer surface 280 of inner bushing 157 facing surface 270. Lubricating fluid cavity 260 may be isolated from lubricating fluid cavity 190 so that a leak in lubricating fluid cavity 260 does not impact lubricating fluid cavity 190 (and vice versa). Lubricating fluid cavity 260 may extend into and be at least partially defined by one or more recesses in surface 270 or surface 280. Alternatively or additionally, lubricating fluid cavity 260 may extend into and be at least partially defined by thrust rings 290*a*, 290*b*, which may be disposed in bushing bores 160*a*, 160*b*, and which may be positioned at axial ends 300*a*, 300*b* of outer bushing 250 and coaxially around inner bushing 157. Thrust rings 290*a*, 290*b* may limit axial load on seal assemblies 310*a*, 310*b*, which may form hermetic seals between outer bushing 250 and links 110*a*, 110*b* to retain the lubricating fluid in lubricating fluid cavity 260.

Figure 5:
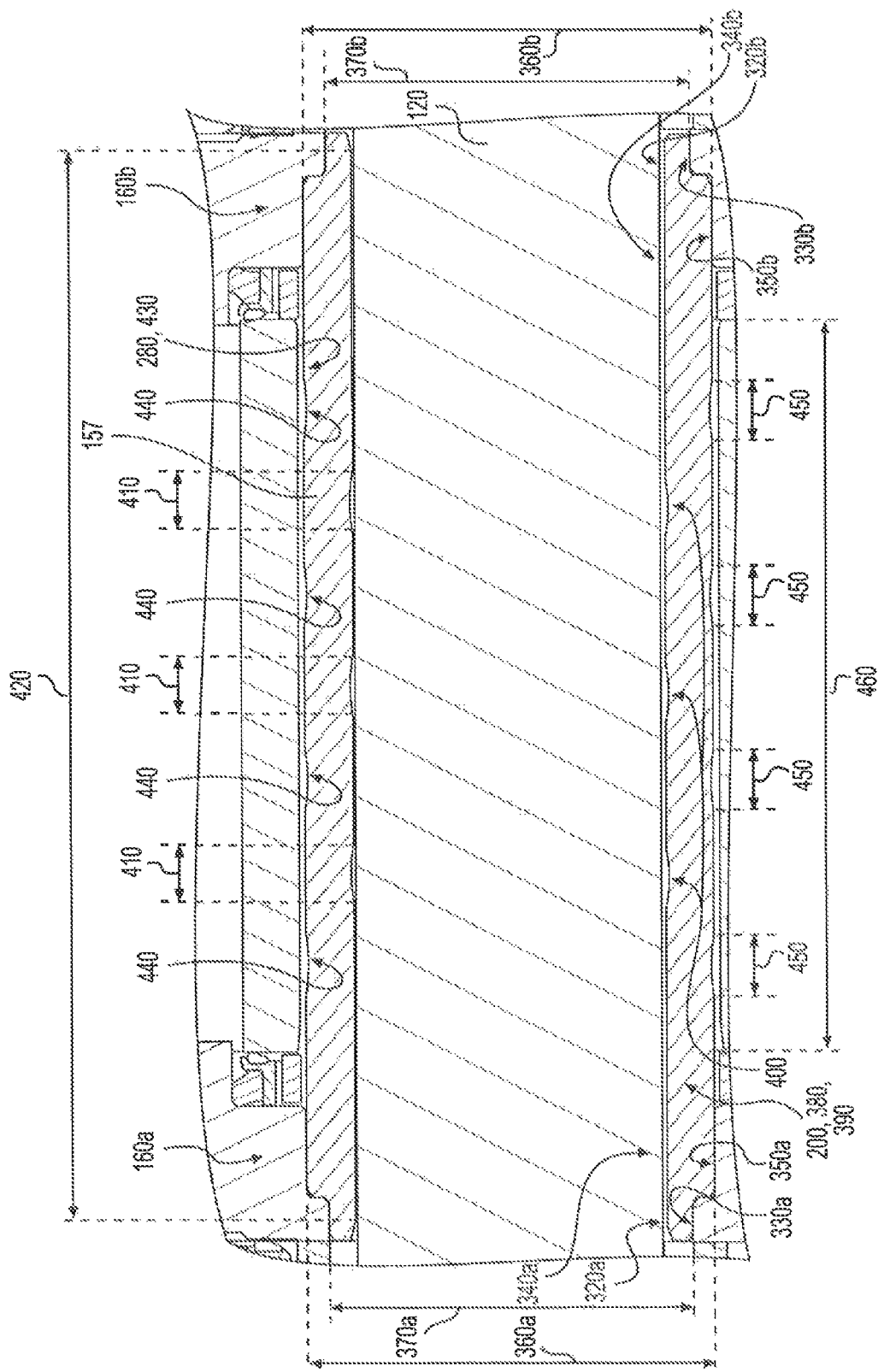
FIG. 5 is an enlarged view of a portion of FIG. 4.

As shown in FIG. 5 and discussed above, bushing 157 may be press-fit into bushing bores 160*a*, 160*b*. In particular, axial end portions 320*a*, 320*b* of bushing 157 may be disposed in and press-fit into outer portions 330*a*, 330*b* of bushing bores 160*a*, 160*b*. Additionally, axial end-adjacent portions 340*a*, 340*b* of bushing 157 may be disposed in and press-fit into central portions 350*a*, 350*b* of bushing bores 160*a*, 160*b*. Thus, axial end portions 320*a*, 320*b* may contact outer portions 330*a*, 330*b*, and axial end-adjacent portions 340*a*, 340*b* may contact central portions 350*a*, 350*b*. In some embodiments, outer diameters 360*a*, 360*b* of end-adjacent portions 340*a*, 340*b* may be larger than outer diameters 370*a*, 370*b* of end portions 320*a*, 320*b*. Accordingly, outer portions 330*a*, 330*b* may have different diameters than central portions 350*a*, 350*b* to account for the differences between diameters 360*a*, 360*b* and 370*a*, 370*b*. In other embodiments, however, outer diameters 360*a*, 360*b* of end-adjacent portions 340*a*, 340*b* may be the same as outer diameters 370*a*, 370*b* of end portions 320*a*, 320*b*, in which case outer portions 330*a*, 330*b* might have the same diameters as central portions 350*a*, 350*b*.

Referring again to FIG. 5, inner surface 200 of bushing 157 may include a generally cylindrical inner surface 380 defining a bore 390. Pin 120 may be positioned at least partially within bore 390 and its motion may thus be constrained by surface 380. Accordingly, surface 380 may be a bearing surface. As shown, inner surface 380 may include three valley-shaped recesses 400, each extending into and along a circumference of bushing 157, and a sum of lengths 410 of recesses 400, in an axial direction of bushing 157, may be approximately 27% of a length 420 of surface 380. It should be understood, however, that inner surface 380 may include a different number of recesses or differently sized recesses. For example, inner surface 380 may include between one and twenty recesses 400, and the sum of lengths 410 may be between approximately 5% and approximately 75% of length 420. It is contemplated, however, that, by using a plurality of recesses 400 (as opposed to a single larger recess 400), the structural integrity of bushing 157 may be maintained. It should also be understood that inner surface 380 may include differently positioned or shaped recesses. For example, inner surface 380 may include valley-shaped recesses extending along the axial direction of bushing 157. Alternatively, inner surface 380 may include helical recesses extending along both circumferential and axial directions of bushing 157.

Outer surface 280 of bushing 157 may include a generally cylindrical outer surface 430, which may constrain motion of outer bushing 250. Thus, surface 430 may be a bearing surface. As shown, outer surface 430 may include a different number of recesses than inner surface 380, and its recesses may be offset, in the axial direction of bushing 157, relative to those of inner surface 380 in order to avoid compromising bushing 157's structural integrity. Specifically, outer surface 430 may include four valley-shaped recesses 440, each extending into and along a circumference of bushing 157, and a sum of lengths 450 of recesses 440, in the axial direction of bushing 157, may be approximately 37% of a length 460 of surface 430. It should be understood, however, that outer surface 430 may include a different number of recesses or differently sized recesses. For example, outer surface 430 may include between one and twenty recesses 440, and the sum of lengths 450 may be between approximately 7% and approximately 38% of length 460. It is contemplated, however, that by using a plurality of recesses 440 (as opposed to a single larger recess 440), the structural integrity of bushing 157 may be maintained. It should also be understood that outer surface 430 may include differently positioned or shaped recesses. For example, outer surface 430 may include valley-shaped recesses extending along the axial direction of bushing 157. Alternatively, outer surface 430 may include helical recesses extending along both circumferential and axial directions of bushing 157. In yet another alternative, outer surface 430 may include recesses that are aligned with (as opposed to offset relative to) those of inner surface 380.

Figure 6:
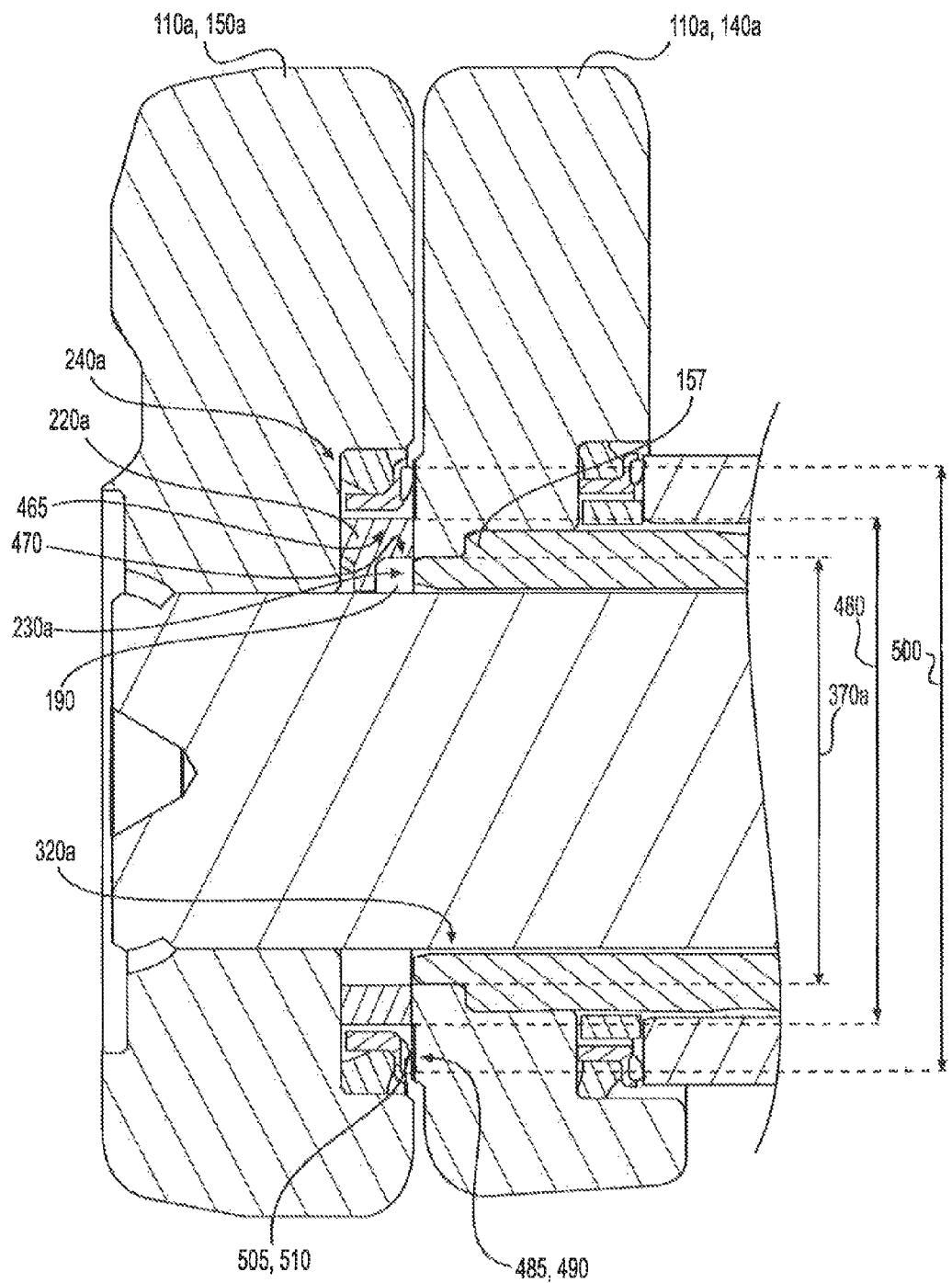
FIG. 6 is another enlarged view of a portion of FIG. 4.

As shown in FIG. 6 and discussed above, thrust ring 220a may be positioned at axial end 230a of bushing 157. Thrust ring 220a may include a generally cylindrical outer surface 465, which may support seal assembly 240a. In addition, thrust ring 220a may include a generally cylindrical inner surface 470, which may at least partially define lubricating fluid cavity 190. As shown, an outer diameter 480 of outer surface 465 (and thus thrust ring 220a) may be larger than outer diameter 370a of axial end portion 320a of inner bushing 157. Specifically, outer diameter 480 may be approximately 1.16 times outer diameter 370a. Alternatively, outer diameter 480 may be another size. For example, outer diameter 480 may be between approximately 1.1 and approximately 2.0 times outer diameter 370a.

Thrust ring 220a's larger diameter may ensure that seal assembly 240a contacts only links 110a, not bushing 157. Specifically, seal assembly 240a may contact a sealing portion 485 of link 110a at a seal-link interface 490. As shown, an outer diameter 500 of seal-link interface 490 may be approximately 1.20 times outer diameter 370a of axial end portion 320a of inner bushing 157. Alternatively, outer diameter 500 may be another size. For example, outer diameter 500 may be between approximately 1.05 and approximately 2.5 times outer diameter 370a.

Sealing portion 485 may include a sealing surface 505 of inwardly offset end 140a of link 110a that faces outwardly offset end 150a of adjacent link 110a. It may be annular and surround axial end 230a of axial end portion 320a, and may include a different material from other portions of link 110a. That is, it may have different material properties from other portions of link 110a. The different material may have a different wear resistance than material of the other portions, and may better resist wear and corrosion resulting from sealing portion 485's contact with seal assembly 240a. For example, the different material may be an electroless nickel coating, a nitride coating, or a carborized coating. In some embodiments, the different material may be a washer 510 attached to link 110a. For example, washer 510 may be press-fit into another portion of link 110a, welded to the other portion, fastened to the other portion with an adhesive, or held in the other portion by an annular biasing member positioned at an inner diameter or an outer diameter of washer 510. In other embodiments, the different material may be clad (e.g., laser clad) to the material of the other portion of link 110a. Alternatively, the different material may be a laser hardened or a thermal sprayed material. In yet another alternative, the different material may be a thin film coating of, for example, chromium nitride, amorphous diamond like carbon, or tetrahedral amorphous carbon.

Figure 7:
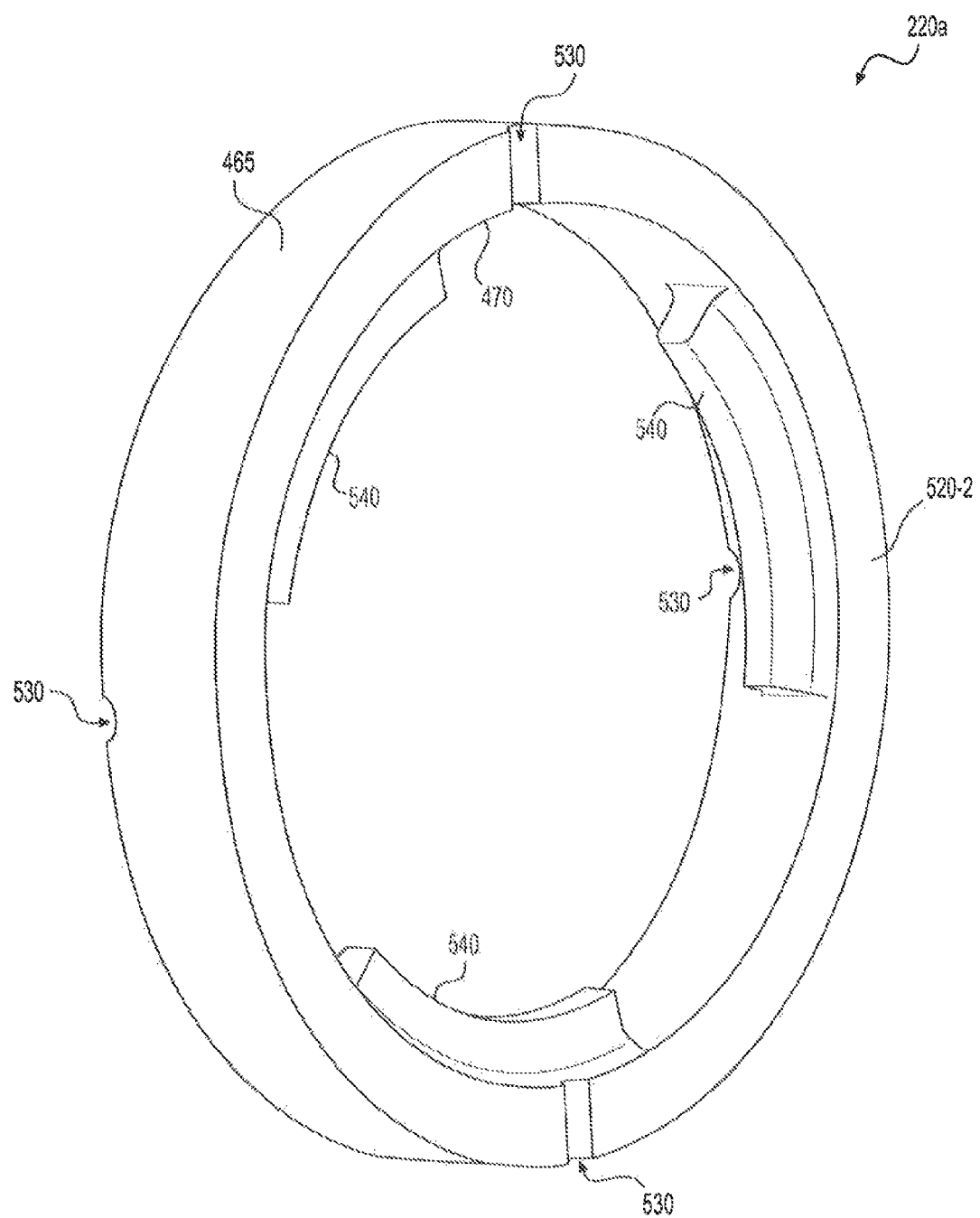
FIG. 7 is a perspective view of a thrust ring of the track joint assembly of FIG. 3.
Figure 8:
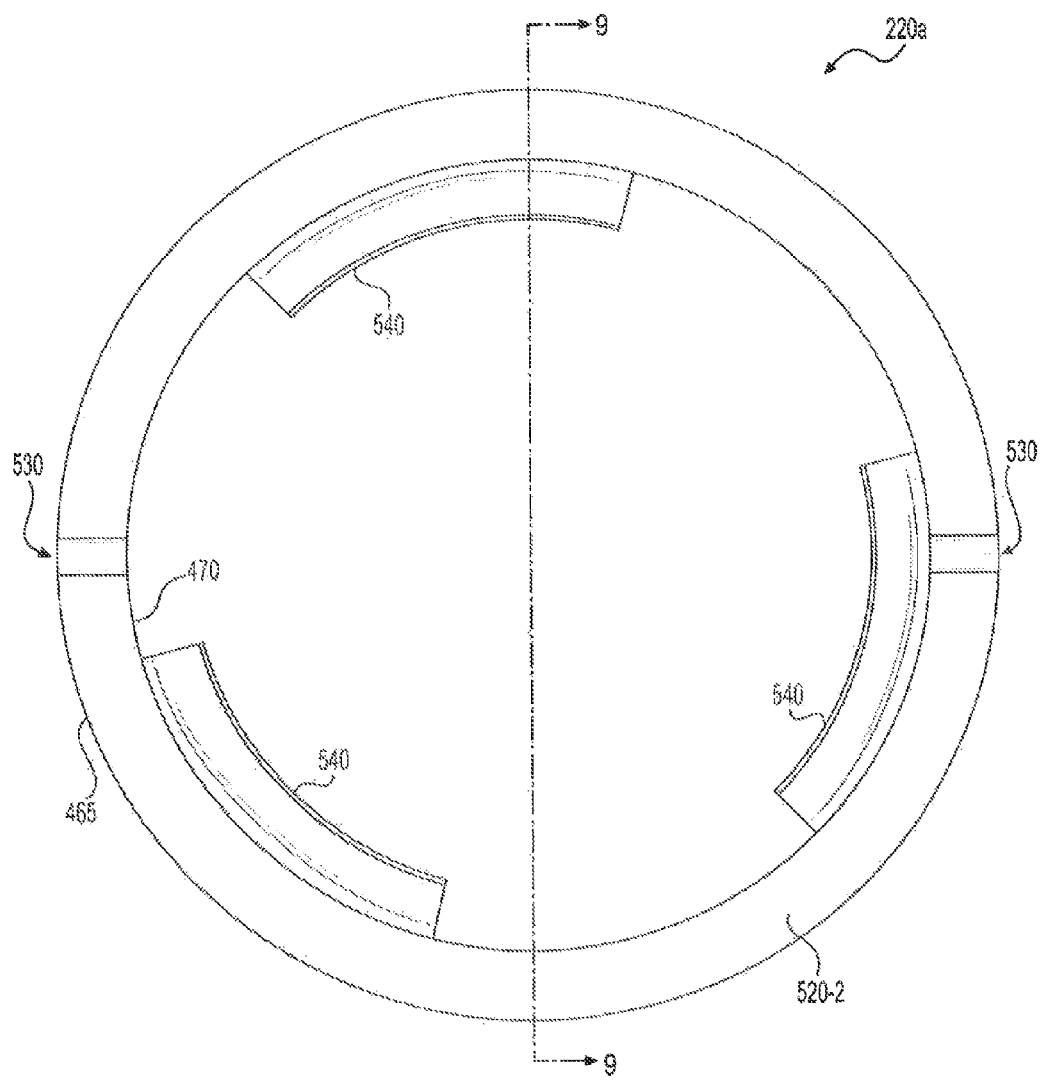
FIG. 8 is a side view of the thrust ring of FIG. 7.
Figure 9:
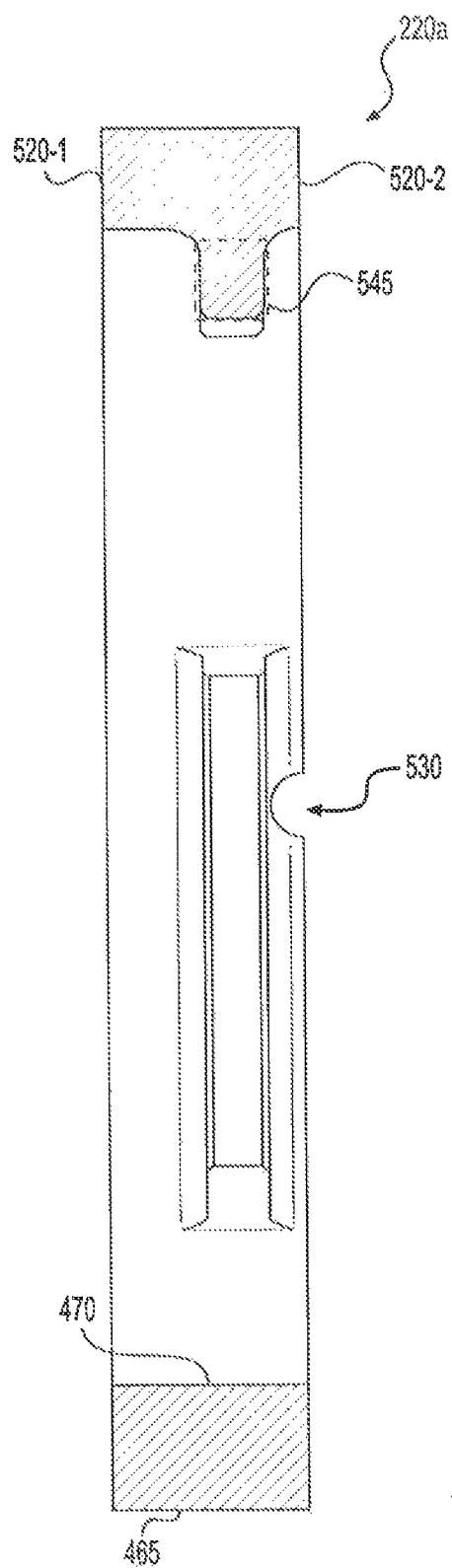
FIG. 9 is a cross-section of the thrust ring of FIG. 7.

Referring to FIGS. 7-9, thrust ring 220a may include axial ends 520-1 and 520-2 connecting outer surface 465 of thrust ring 220a to inner surface 470 of thrust ring 220a. As shown, each of axial ends 520-1 and 520-2 may include two recesses 530, which may extend from outer surface 465 to inner surface 470 to facilitate lubricating fluid flow between an exterior of thrust ring 220a and an interior of thrust ring 220a. Alternatively, axial ends 520-1 and 520-2 may include another number of recesses. For example, in some embodiments, axial end 520-1 may include a different number of recesses than axial end 520-2.

As shown in FIGS. 7-9, inner surface 470 of thrust ring 220a may include three protrusions 540, all extending along a circumference of thrust ring 220a and toward a central axis of thrust ring 220a. Protrusions 540 may have approximately rectangular cross-sections 545, and may be offset, in an axial direction of thrust ring 220a, from a center of thrust ring 220a, as best shown in FIG. 9. Some embodiments, however, may include different configurations of protrusions. For example, some embodiments may have only one protrusion, which may or may not extend along an entire circumference of thrust ring 220a. Other embodiments may have a plurality of protrusions, but such protrusions may be shaped or positioned differently than protrusions 540. For example, instead of having approximately rectangular cross-sections, they may have approximately U-shaped or V-shaped protrusions, and they may or may not be offset from the center of thrust ring 220a.

Figure 10:
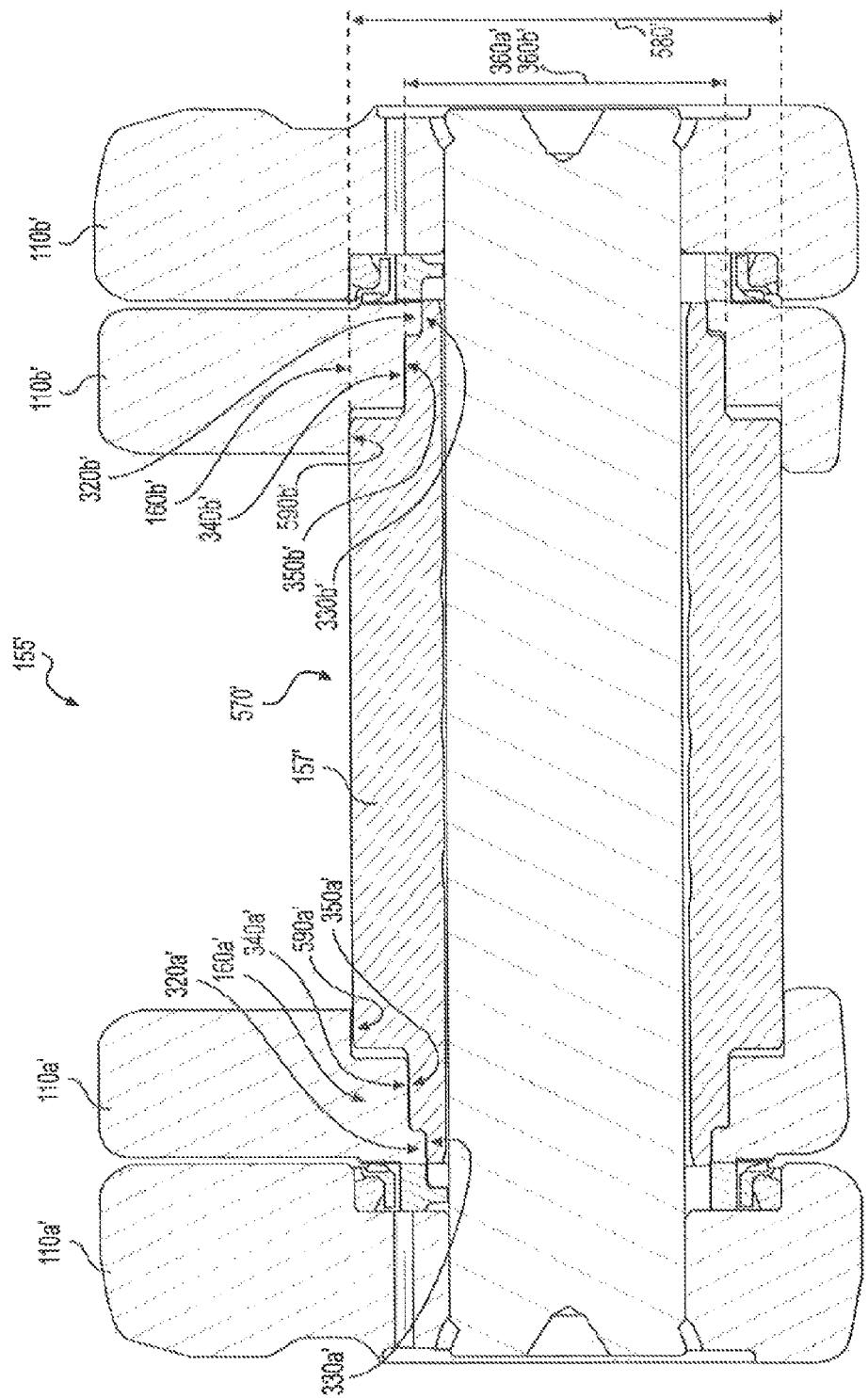
FIG. 10 is a cross-section of another track joint assembly according to the present disclosure.

FIG. 10 illustrates another embodiment of a track joint assembly 155' including a different bushing configuration. Instead of having inner bushing 157 and outer bushing 250, track joint assembly 155' may include only a single bushing 157'. Otherwise, track joint assembly 155' may be identical to track joint assembly 155.

Bushing 157' may be similar to bushing 157. Accordingly, only the ways in which bushing 157' differs from bushing 157 will be described. Bushing 157' may include a middle portion 570' between axial end-adjacent portions 340a', 340b'. Thus, middle portion 570' may be separated from axial end portions 320a', 320b' by axial end-adjacent portions 340a', 340b'. Middle portion 570' may have an outer diameter 580' that is larger than outer diameters 360a', 360b' of end-adjacent portions 340a', 340b' to maximize the amount of wear that middle portion 570' may sustain as a result of engagement with the drive sprocket. For example, outer diameter 580' may be approximately 1.49 times outer diameters 360a', 360b'. It should be understood, however, that outer diameter 580' may be another size. For example, outer diameter 580' may be between approximately 1.25 and approximately 2.00 times outer diameters 360$a'$, 360$b'$. In some embodiments, middle portion 570' may be positioned at least partially within inner portions 590$a'$, 590$b'$ of bushing bores 160$a'$, 160'. In other embodiments, middle portion 570' may not be positioned at least partially within inner portions 590$a'$, 590$b'$.

Figure 11:
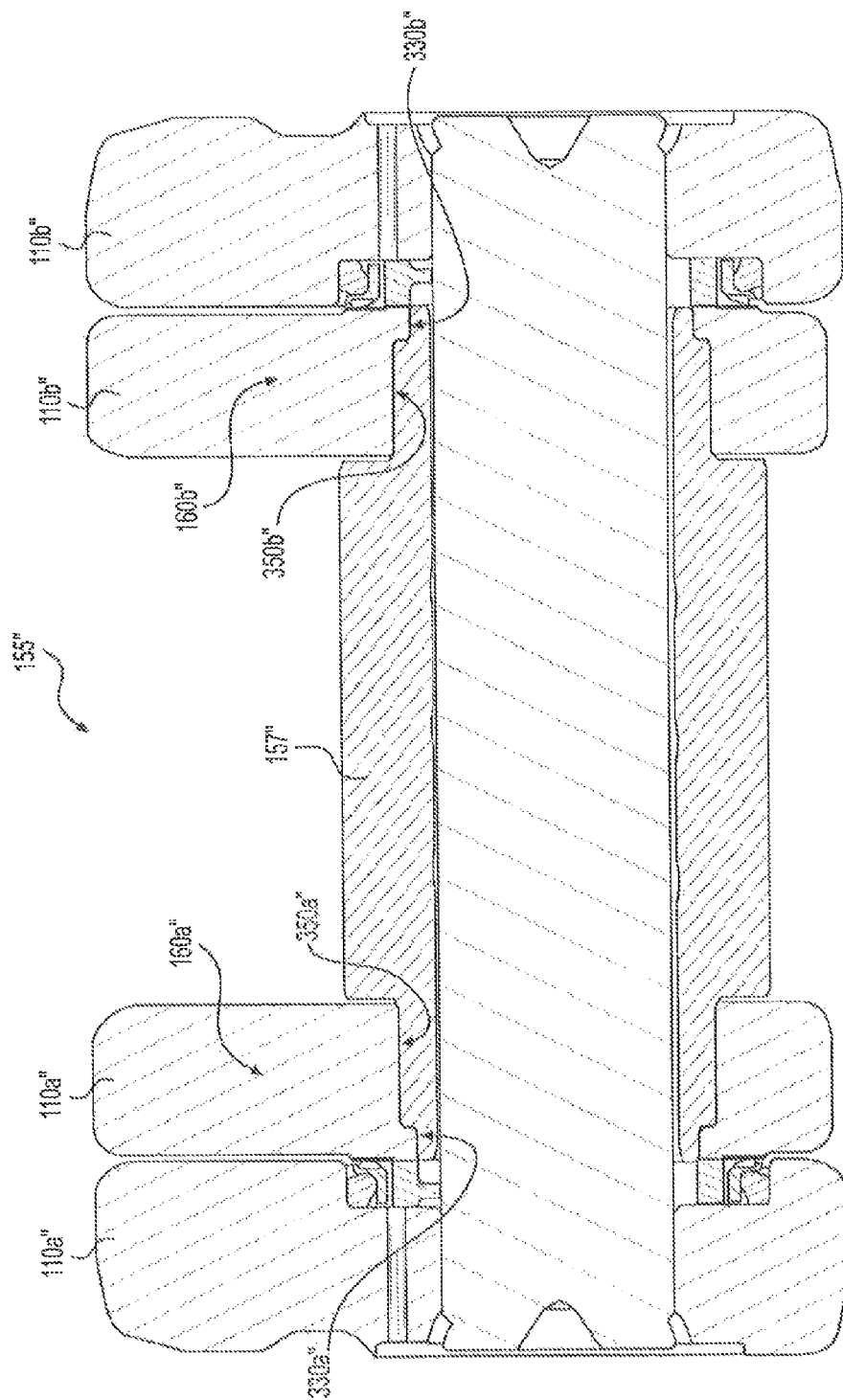
FIG. 11 is a cross-section of yet another track joint assembly according to the present disclosure.

FIG. 11 illustrates yet another embodiment of track joint assembly 155" including different bushing and link configurations. Like track joint assembly 155', instead of having inner bushing 157 and outer bushing 250, track joint assembly 155" may include only a single bushing 157". Additionally, instead of having links 110$a$, 110$b$, track joint assembly 155" may include links 110$a$" and 110$b$". Bushing 157" may be similar to bushing 157', and links 110$a$", 110$b$" may be similar to links 110$a'$, 110$b'$ (and thus links 110$a$, 110$b$). Links 110$a$", 110$b$" may differ from links 110$a'$, 110$b'$ only in that they include bushing bores 160$a$", 160$b$" having only two portions (outer portions 330$a$", 330$b$" and central portions 350$a$", 350$b$") instead of three portions (outer portions 330$a'$, 330$b'$, central portions 350$a'$, 350$b'$, and inner portions 590$a'$, 590$b'$). And bushing 157" may differ from bushing 157' only in that middle portion 570" may not be positioned at least partially within inner portions of bushing bores 160$a$", 160$b$". Otherwise, track joint assembly 155" may be identical to track joint assemblies 155 and 155'.

The components of track joint assemblies 155, 155', 155" may be constructed of various materials. In some embodiments, links 110$a$, 110$b$, 110$a'$, 110$b'$, 110$a$", 110$b$"; bushings 157, 157', 157"; bushings 250; thrust rings 220$a$, 220$b$; and thrust rings 290$a$, 290$b$ may be constructed of metal. For example, each of these components may be constructed of a ferrous metal, such as steel or iron.

The configuration of track joint assemblies 155, 155', 155" is not limited to the configurations discussed above and shown in the drawings. For example, outer surface 210 of pin 120 may include recesses instead of inner surface 200 of bushing 157. Such recesses may be similar to recesses 440 in outer surface 280 of bushing 157. As another example, inner surface 270 of outer bushing 250 may include recesses instead of outer surface 280 of bushing 157. Such recesses may be similar to recesses 400 in inner surface 200 of bushing 157.

INDUSTRIAL APPLICABILITY

The disclosed track joint assemblies may be applicable to track-type machines, such as, for example, loaders, tractors, excavators, and tanks, and may facilitate movement of the machines. The disclosed track joint assemblies may have various advantages over prior art track joint assemblies. For example, the disclosed track joint assemblies may be stronger and more durable than prior art track joint assemblies. In addition, manufacturing the disclosed track joint assemblies may cost less than manufacturing prior art track joint assemblies, and may require less material than manufacturing prior art track joint assemblies. Specific advantages of the disclosed track joint assemblies will now be described.

Track joint assembly 155 may include direct connections between links 110$a$, 110$b$ that strengthen and improve the durability of track joint assembly 155. Specifically, inwardly offset ends 140$a$, 140$b$ of links 110$a$, 110$b$ may be directly connected by being secured to bushing 157. Likewise, outwardly offset ends 150$a$, 150$b$ of links 110$a$, 110$b$ may be directly connected by being secured to pin 120. Such direct connections between links 110$a$, 110$b$ may strengthen and improve the durability of track joint assembly 155 by reducing its susceptibility to vibrations and impacts.

Track joint assembly 155 may be configured to facilitate rotation of bushing 157 relative to pin 120 even when pin 120 is solid (and thus capable of being manufactured without using costly machining, drilling, or casting processes). In particular, the rotation may be facilitated by coating one or both of bushing 157 and pin 120 with diamond like carbon or electro less nickel, or by carburizing, nitriding, or polishing one or both of bushing 157 and pin 120 to reduce friction between bushing 157 and pin 120. Alternatively or additionally, the rotation may be facilitated by situating a lubricating fluid between bushing 157 and pin 120. Specifically, the lubricating fluid may be added through openings 180$a$, 180$b$ in links 110$a$, 110$b$, and may be contained in lubricating fluid cavity 190. Since pin 120 is solid, rather than extending into an interior cavity of pin 120, lubricating fluid cavity 190 may extend into and be at least partially defined by one or more recesses in inner surface 200 of bushing 157 or outer surface 210 of pin 120. Alternatively or additionally, lubricating fluid cavity 190 may extend into and be at least partially defined by thrust rings 220$a$, 220$b$.

Track joint assembly 155 may be configured to minimize the total amount of material required to manufacture links 110$a$, 110$b$. Such minimization may be achieved by reducing the number of components disposed in bushing bores 160$a$, 160$b$ of links 110$a$, 110$b$. For example, no collar or seal insert needs to be positioned between bushing bore 160$a$ and bushing 157, because the material of sealing portion 485 of link 110$a$ may resist wear and corrosion resulting from sealing portion 485's contact with seal assembly 240$a$. Thus, inwardly offset ends 140$a$ of links 110$a$ may be secured directly to bushing 157, minimizing the number of components disposed in bushing bore 160$a$ and thus the size of bushing bore 160$a$ and link 110$a$. For example, the diameter of central portion 350$a$ of bushing bore 160$a$ may be less than 1.49 times the diameter of pin bore 170$a$. Additionally, the diameter of central portion 350$a$ of bushing bore 160$a$ may be less than 0.87 times the outer diameter of outer bushing 250.

Track joint assemblies 155, 155' and 155" may be optimized for specific applications but include many interchangeable parts to minimize manufacturing costs. For example, track joint assembly 155 may be optimized for high impact applications in which drive sprockets quickly wear down bushings connecting links 110$a$, 110$b$, while track joint assemblies 155' and 155" may be optimized for low impact applications in which bushing wear is not a major concern. As discussed above, however, such optimizations only affect a few parts of track joint assemblies 155, 155', and 155". Thus, virtually all of the parts of track joint assemblies 155, 155', and 155" are interchangeable.

It will be apparent to those skilled in the art that various modifications and variations can be made to the disclosed track joint assemblies. Other embodiments will be apparent to those skilled in the art from consideration of the specification and practice of the disclosed track joint assemblies. It is intended that the specification and examples be considered as exemplary only, with a true scope being indicated by the following claims and their equivalents.

What is claimed is:
1. A track joint assembly, comprising:
 a first link having a first bore;
 a second link having a second bore;
 a solid pin positioned at least partially within the first bore; and a bushing positioned coaxially around the pin, the bushing extending from a first axial end to a second axial end and including an axial end portion disposed in the second bore, wherein:
a peripheral portion of the second link has a peripheral surface that circumscribes the first axial end and the second link includes a sealing portion; and
the sealing portion includes material having a different wear resistance than material of an other portion of the second link.

2. The track joint assembly of claim 1, wherein the sealing surface faces the first link.

3. The track joint assembly of claim 2, wherein the sealing portion is annular.

4. The track joint assembly of claim 1, wherein the sealing portion is a washer attached to the other portion.

5. The track joint assembly of claim 4, wherein the washer is press-fit into the other portion.

6. The track joint assembly of claim 4, wherein the washer is welded to the other portion.

7. The track joint assembly of claim 4, wherein the washer is fastened to the other portion with an adhesive.

8. The track joint assembly of claim 1, wherein the material of the sealing portion is clad to the material of the other portion.

9. The track joint assembly of claim 1, wherein the material of the sealing portion includes an electroless nickel coating, a nitride coating, or a carborized coating.

10. A track joint assembly, comprising:
a first link having a first bore;
a second link having a second bore; and
a bushing extending from a first axial end to a second axial end, including:
a first axial end portion disposed in the first bore; and
a second axial end portion disposed in the second bore, wherein:
a peripheral portion of the first link has a peripheral surface circumscribing the first axial end and the first link includes a sealing portion; and
the sealing portion includes material having a different wear resistance than material of an other portion of the first link.

11. The track joint assembly of claim 10, wherein the sealing surface faces another link.

12. The track joint assembly of claim 11, wherein the sealing portion is annular.

13. The track joint assembly of claim 10, wherein the sealing portion is a washer attached to the other portion.

14. The track joint assembly of claim 13, wherein the washer is press-fit into the other portion.

15. The track joint assembly of claim 13, wherein the washer is welded to the other portion.

16. The track joint assembly of claim 13, wherein the washer is fastened to the other portion with an adhesive.

17. The track joint assembly of claim 10, wherein the material of the sealing portion is clad to the material of the other portion.

18. The track joint assembly of claim 10, wherein the material of the sealing portion includes an electroless nickel coating, a nitride coating, or a carborized coating.

19. A track joint assembly, comprising:
a first link having a first bore; a second link having a second bore;
a solid pin positioned at least partially within the first bore;
a bushing positioned coaxially around the pin, and at least partially within the second bore; and
a seal assembly positioned between the first link and the second link, and contacting opposing faces of the first link and the second link.

20. The track joint assembly of claim 19, wherein the seal assembly contacts a sealing portion of the second link including material having a different wear resistance than material of another portion of the second link.

* * * * *